2,695,274

Patented Nov. 23, 1954

2,695,274

STABLE LITHIUM HYPOCHLORITE COMPOSITION

James Douglas MacMahon, Niagara Falls, N. Y., assignor to Mathieson Chemical Corporation, a corporation of Virginia No Drawing. Application December 23, 1949, Serial No. 134,865

7 Claims. (Cl. 252—99)

My invention relates to the production of dry, free-flowing stable hypochlorite compositions consisting essentially of partially hydrated lithium hypochlorite and potassium carbonate which are stabilized by the presence of the potassium carbonate in finely divided form in an amount in substantial excess of that required to combine with all hydrate water present in the composition. In a more particular aspect, it relates to the production of such compositions containing one or more water-soluble alkali metal detergents and, still more particularly, a synthetic detergent or wetting agent. My dry stable lithium hypochlorite compositions are valuable disinfecting and cleansing aids in sanitizing operations, such as the disinfection and cleansing of pipe lines, pasteurizers, coolers and containers in milk and other food processing plants, for example, or of such kitchen utensils as dishes and glassware in food and drink dispensing establishments.

Hypochlorites are commercially valued as ingredients in sanitizing compositions, but they often suffer the serious disability of lack of stability under the usual conditions of shipping, storage and use. Of the hypochlorites, calcium hypochlorite is generally taken as the hypochlorite of commercial choice because of its greater stability. Calcium hypochlorite, however, does not produce clear solutions but suffers the disadvantage of troublesome precipitates. Solid sodium hypochlorite itself produces substantially clear solutions but is notoriously unstable even to the point of creating explosion hazards. As a consequence, lithium hypochlorite is obtaining increasing commercial recognition as an ingredient in disinfecting and sanitizing compositions, but its utilization is associated with difficult problems of stabilization.

Anhydrous lithium hypochlorite unlike the sodium and potassium hypochlorites is comparatively stable, but unfortunately lithium hypochlorite is produced as the monohydrate which is too unstable for commercial use. As produced, lithium hypochlorite monohydrate almost always contains small quantities of impurities, such as hydrates of lithium chloride, lithium chlorate, sodium or potassium carbonate, hydroxide or sulfate depending upon the method and conditions of preparation. These impurities contribute considerably to decomposition of the lithium hypochlorite. Lithium chloride and lithium chlorate particularly are very hygroscopic and tend to absorb water to the point where a liquid phase promoting decomposition of lithium hypochlorite occurs.

Carbonates, hydroxides and sulfates react with lithium hypochlorite if any liquid phase water is present and the resulting lithium salts are less water soluble than lithium hypochlorite so that the reaction tends to go to completion, accelerating the decomposition of lithium hypochlorite. In commercial utilization of lithium hypochlorite in sanitizing compositions, it is ordinarily desirable to incorporate soda ash or other alkali metal detergent, possibly a polyphosphate sequestering agent for use in hard waters, and a wetting agent. Such materials in commercial form frequently contain a few per cent of hydrate water or, as in the case of soda ash, tend to absorb moisture from the air where intermittent use involves repeated exposure of the composition to air.

Lithium hypochlorite can be dehydrated so as to have commercial value with respect to stability but even in the laboratory it is a tedious and uncertain proceeding. Under commercial conditions of production, from a few per cent to about 50 per cent of the water of hydration of the lithium hypochlorite monohydrate remain in the dehydrated product. It is not only difficult and expensive to remove the last few per cent of hydrate water, but the conditions of dehydration are likely to decompose the hypochlorite.

I have discovered that partially dehydrated lithium hypochlorite monohydrate can be effectively stabilized without the necessity of complete dehydration by intimate admixture with potassium carbonate. The partially dehydrated lithium hypochlorite monohydrate must be sensibly dry and, to insure absence of any liquid phase water, should be dehydrated at least to the extent that it contains a small amount, say 2 or 3 per cent, of anhydrous lithium hypochlorite. The lithium hypochlorite should pass about a 20-mesh screen. The potassium carbonate may be commercial pearl ash containing the usual traces of water, but it should be relatively finely divided. For example, I have found that a commercial product in which about 70 per cent passes a 200-mesh screen gives satisfactory results whereas ordinary laboratory grade potassium carbonate of about 10–65 mesh does not. The potassium carbonate should be employed in substantial excess of that amount required to combine with all water present in the total composition to form $K_2CO_3 \cdot 1.5H_2O$. Surprisingly enough, I have found that potassium carbonate is not a specially good desiccant where the lithium hypochlorite and other materials present are substantially anhydrous. I have discovered, however, that potassium carbonate is a specially good desiccant for lithium hypochlorite compositions containing partially hydrated materials or materials such as soda ash, which tend to pick up water upon exposure to air. I have also discovered that potassium carbonate is a particularly good desiccant for compositions containing synthetic detergents or wetting agents which are advantageously employed in hypochlorite compositions but which are not available in the completely dry state.

I have found that my invention is particularly valuable in permitting the use of commercially prepared lithium hypochlorite. The most practical and economical processes for producing lithium hypochlorite result in a product containing perhaps 2 to 4 per cent of lithium chloride and a small quantity of lithium chlorate. Both of these materials are extremely hygroscopic and removal of their water of hydration requires drying conditions that are harmful to anhydrous lithium hypochlorite. Because of its extreme hygroscopicity lithium chlorate, particularly, will be present as the hemi-hydrate. At ordinary room temperatures of 20° to 25° C., the hemi-hydrate is stable, but at about 30° C. and above a liquid phase is formed so that under storage conditions, it is quite likely that lithium chlorate is an important factor in initiating and promoting the decomposition of lithium hypochlorite. Further, for reasons of economics in drying it is commercially desirable to leave at least a few per cent of water and probably up to as much as one third or one half of the total water of hydration in the hypochlorite product. I have found that potassium carbonate is an especially useful desiccant under such circumstances. It is an extremely energetic desiccant so that it functions rapidly enough to take up the water of hydration present without formation of a liquid phase which would permit reaction with the lithium hypochlorite. It does a better job than sodium monoxide when a relatively high proportion of the monohydrate is present. Sodium monoxide in desiccation forms sodium hydroxide, the hydrates of which are more likely to induce formation of a liquid phase, thus promoting hypochlorite decomposition. Furthermore, potassium carbonate does not possess the difficulties and hazards of use connected with that compound which is very difficult to grind to acceptable subdivision and which reacts violently with water. Other carbonates such as sodium carbonate as well as phosphates and sulfates having desiccant activity in some environments appear to be ineffective as stabilizers in lithium hypochlorite compositions unless all of the ingredients are substantially anhydrous.

Hence a particularly important characteristic of my lithium hypochlorite-containing composition is its stability. Unlike most hypochlorite preparations heretofore employed, it may be stored over a period of months with only slight loss of its available chlorine content. It has the added quality of ability to offset pickup of water from the air as occurs for example in dairy farm sanitation where a hypochlorite composition is consumed at the rate of a few spoonsful a day from say a one- or two-pound bottle. My composition differs from compositions containing calcium hypochlorite in that with water it yields directly aqueous cleansing and disinfecting solutions that are clear or only slightly turbid. In addition to lithium hypochlorite and potassium carbonate, my composition may contain water-soluble alkali metal carbonates, water-soluble alkali metal phosphates, water-soluble alkali metal silicates or any suitable combination of two or more of such alkaline salts. Inert salts such as sodium chloride and potassium chloride may be present in the composition. When the composition is added to hard water, compounds which prevent precipitation of alkaline earth metal salts are advantageously present. My composition may further contain a wetting agent in order to enhance its bactericidal action.

The potassium carbonate used in my composition should be substantially anhydrous and the other components should be as nearly anhydrous as possible to reduce potassium carbonate requirements. Sufficient potassium carbonate is used to combine with all the water present in the lithium hypochlorite, in any of the added alkaline salts and in any synthetic organic detergent which is added to the composition. An excess of potassium carbonate calculated on the basis of the formation of K$_2$CO$_3$1.5H$_2$O is added. In the presence of excess potassium carbonate, no liquid phase is formed in which a double decomposition reaction can occur between lithium hypochlorite and potassium carbonate to form potassium hypochlorite and insoluble lithium carbonate. Such reaction would seriously impair the stability of the composition. Usually about twice the theoretical amount necessary to take up the water present is effective, but for severe conditions of intermittent use, I prefer to use up to five times the theoretical proportion.

The potassium carbonate used in the present compositions should be finely ground as noted above. It is advantageous to mix the potassium carbonate, lithium hypochlorite and other components, for example, in a rotary mixer or other mechanical agitating device that will achieve a uniform mixture as rapidly as possible.

Tribasic sodium and potassium phosphates are examples of the alkali metal phosphates suitable for employment in my composition. Ordinarily, anhydrous materials are used but one of the special advantages of my invention is that the hydrated forms may be used and no special dehydration is required. For example, trisolium phosphate monohydrate may be used. Sufficient potassium carbonate is added to combine with the water of crystallization. Sodium and potassium silicates represent examples of other useful alkaline materials. One advantage of employing a silicate in the composition is that it prevents discoloration of aluminum articles of equipment with which the solution of the composition comes in contact and corrosion of the aluminum is thus prevented. The anhydrous silicates are preferably used or the amount of anhydrous potassium carbonate is adjusted to afford ample desiccant to combine with the water of crystallization. Insoluble lithium carbonate, phosphate and silicate are not suitable for use.

Mixtures of water-soluble alkaline detergents may be used in the preparation of the composition, for example, mixtures of sodium carbonate and sodium bicarbonate or a mixture of trisodium phosphate and disodium phosphate. To avoid the possibility of an excessive rate of decomposition under conditions of commercial use, I prefer to limit the proportion of acid salt to an amount not substantially exceeding that of the normal salt where these are the only alkaline detergent salts present in the mixture. I have found that mixtures containing any higher proportion of sodium bicarbonate or disodium phosphate are unstable.

Lithium hypochlorite monohydrate is conventionally prepared by chlorinating lithium hydroxide solution and separating the monohydrate from the solution by evaporation. The lithium hypochlorite monohydrate is dried and partial dehydration is at least initiated by mild treatment. For example, the monohydrate is vacuum dried as a film on rotary drum driers under mild conditions that will not cause excessive decomposition. Advantageously, however, the water content of the monohydrate is reduced to about ⅓ or ½ of the original. However, conventional methods of preparing lithium hypochlorite result in the formation of a substantial proportion of lithium chloride which is difficult to separate from the hypochlorite. Where a substantially lithium chloride-free product is desired, the method disclosed in United States Patents Nos. 1,481,039 and 1,481,040 may be used. Thus, the monohydrate may be prepared by chlorinating a solution or slurry of lithium hydroxide or other alkali or alkaline earth metal hydroxide to form a mixture of chloride and hypochlorite, separating the hypochlorite from the chloride by treatment with a tertiary alcohol to form the corresponding alkyl hypochlorite, which is readily separable from the chloride, and subsequently treating the separated alkyl hypochlorite with lithium hydroxide whereby the alkyl hypochlorite is converted to lithium hypochlorite which is separated by evaporation of the solution as lithium hypochlorite monohydrate substantially free from lithium chloride.

As a further alternative, the lithium hypochlorite monohydrate may be prepared substantially free from lithium chloride but containing sodium or potassium chloride by reacting lithium chloride with a hypochlorite of sodium or potassium. As previously indicated herein, the presence of sodium or potassium chloride in the composition of the invention is not objectionable. As a still further alternative, the lithium hypochlorite monohydrate may be produced by reacting an alkaline earth metal hypochlorite with lithium carbonate.

In the practice of the invention, I also may use with advantage lithium hypochlorite prepared by drying lithium hypochlorite monohydrate at a temperature within the range of from about 20° to 60° C. and at a low pressure.

I have further found that the lithium hypochlorite product prepared in admixture with anhydrous sodium sulfate, disclosed and described in application Serial No. 136,856, filed January 4, 1950, of Homer L. Robson, now U. S. Patent No. 2,640,028, issued May 26, 1953, may be advantageously treated according to the method of my invention.

Where my composition is to be dissolved in hard water, I customarily include a polyphosphate as a component of the composition in order to check any tendency toward turbidity. Exemplary of suitable polyphosphates may be mentioned tetrasodium pyrophosphate, sodium tetraphosphate, sodium hexametaphosphate, sodium tripolyphosphate and the like. Substantially larger amounts of polyphosphate than about 5 per cent on the alkaline component are usually unnecessary in order to prevent the precipitation of insoluble calcium or magnesium salts when the composition is dissolved in hard water. In general, the amount of polyphosphate included in the composition depends on the degree of hardness of the water to which the composition is to be added.

Suitable wetting agents for inclusion in the composition of the invention are those stable in the presence of the alkaline component and lithium hypochlorite. As examples, may be mentioned Nacconal, or sodium decylbenzene sulfonate, Nekal BX, or sodium isobutylnaphthalene sulfonate, Santomerse, another alkylated benzene sulfonate, Orvus, or commercial sodium lauryl sulfate, Ultravon KW, a sulfonated or sulfated stearyl compound, a quaternary ammonium compound, e. g. Hyamine, or di-isobutyl phenoxy ethoxyethyl dimethyl benzyl ammonium chloride.

In the preparation of the composition of the invention, any suitable device such as an ordinary mixing drum adapted for the intimate admixing of solid particles may be employed. For best results, the components should have a uniform particle sizing. Conditions of mixing should be such as to avoid melting and formation of a melted aqueous phase.

The following examples are submitted in illustration of the stability of my composition:

*Example I*

For compounding in the composition of this exampl a sample of lithium hypochlorite was used which wh analyzed was calculated to contain the following components:

Component:
| | |
|---|---:|
| LiOCl | 87.35 |
| LiOCl.H₂O | 3.5 |
| (LiOCl percent hydrated) | (2.95) |
| LiCl.H₂O | 5.1 |
| LiClO₃.5H₂O | 3.65 |
| LiOH | 0.4 |
| Total | 99.97 |

A composition of the present invention was prepared by intimately admixing 90 parts of anhydrous potassium carbonate and 10 parts of the lithium hypochlorite preparation having the above analysis. Samples of the blend were stored in small bottles at 30° C. No loss in available chlorine occurred after 3 months' storage. Analysis after 365 days at 30° C. showed samples containing 11.30 and 11.00 per cent of available chlorine compared with an original value of 12.46 per cent. This stability exceeds that ordinarily required for commercial use.

Another composition exhibiting satisfactory stability is the following which has special utility as a rug cleaning composition:

Component:
| | |
|---|---:|
| LiOCl preparation as above | 5 |
| K₂CO₃ | 10 |
| Na₂CO₃ | 34 |
| NaHCO₃ | 16 |
| Orvus (sodium salt of technical lauric acid) | 35 |
| Total | 100 |

The following compositions tabulated below illustrate the use of various water-soluble alkali metal detergent salts and the use of an alkyl aryl sulfonate as a wetting agent according to my invention. These compositions also exhibit satisfactory stability for commercial purposes.

| Component: | | | | | | |
|---|---:|---:|---:|---:|---:|---:|
| LiOCl preparation as above | 33 | 33 | 33 | 33 | 33 | 10 |
| K₂CO₃ | 9 | 9 | 9 | 9 | 9 | 8 |
| Na₂CO₃ | 28 | 18 | 28 | | 28 | 48 |
| Na₃PO₄.H₂O | 27 | 27 | | | 18 | 19 |
| Na₅P₃O₁₀ (tripoly) | 3 | 3 | | | | 5 |
| NaHCO₃ | | 10 | | | | |
| Na₂SiO₃ (anhydrous) | | | 27 | | | |
| Na₄P₂O₇ | | | 3 | | | |
| K₃PO₄ | | | | 27 | | |
| K₄P₂O₇ | | | | 3 | | |
| Na₂HPO₄ | | | | | 9 | |
| Na₆P₆O₁₈ | | | | | 3 | |
| Alkyl aryl sulfonate | | | | | | 10 |
| Total | 100 | 100 | 100 | 100 | 100 | 100 |

*Example II*

In order to show the effectiveness of potassium carbonate, a very poor sample of lithium hypochlorite monohydrate was used which when analyzed was calculated to contain the following components:

Component:
| | |
|---|---:|
| LiOCl | 1.9 |
| LiOCl.H₂O | 55.8 |
| (LiOCl percent hydrated) | (96.0) |
| LiCl.H₂O | 27.0 |
| LiClO₃.5H₂O | 14.0 |
| Other salts | 1.3 |
| Total | 100.0 |

A mixture of 50 parts of this lithium hypochlorite with 200 parts of commercial pearl ash was prepared and stored at 30° C. After 66 days there was no loss in available chlorine content. Another sample stored at 5° C. showed 9.9 per cent of available chlorine after 11 days and 8.82 per cent after 31 days compared with an original value of 10.8 per cent chlorine. This mixture may be considered satisfactory compared with other hypochlorite mixtures tested at 55° C.

*Example III*

The lithium hypochlorite preparation used in the example when analyzed was calculated to contain the following components:

Component:
| | |
|---|---:|
| LiOCl | 65 |
| LiOCl.H₂O | 20 |
| LiCl.H₂O | 12 |
| Other salts | 3 |
| Total | 100 |

A mixture of 50 parts of this lithium hypochlorite with 40 parts of commercial pearl ash and 10 parts of sodium carbonate was prepared to yield a finished composition of high available chlorine content. The composition has satisfactory stability for commercial use.

*Example IV*

The lithium hypochlorite preparation used in this example when analyzed was calculated to contain the following components:

Component:
| | |
|---|---:|
| LiOCl | 18.2 |
| LiOCl.H₂O | 13.1 |
| (LiOCl per cent hydrated) | (44.0) |
| LiCl.H₂O | 6.4 |
| Other salts | 62.3 |
| Total | 100.0 |

Two mixtures were prepared from this lithium hypochlorite. The first contained 33.3 per cent of the lithium hypochlorite preparation, 55.5 per cent anhydrous soda ash and 11.1 per cent anhydrous potassium carbonate. The second contained 33.3 per cent of the lithium hypochlorite preparation, 44.5 per cent sodium carbonate and 22.2 per cent potassium carbonate. These mixtures were stored at 55° C. together with a sample of the lithium hypochlorite preparation containing no added carbonates. After 42 days the latter sample showed no available chlorine and the two carbonates containing samples showed decreases from an original value of 10.47 to 6.81 per cent and from an original value of 10.68 to 6.86 per cent respectively. At this elevated temperature, this is a very acceptable loss.

*Example V*

The lithium hypochlorite preparation used in this example when analyzed was calculated to contain the following components:

Component:
| | |
|---|---:|
| LiOCl | 4.5 |
| LiOCl.H₂O | 28.8 |
| (LiOCl percent hydrated) | (83.0) |
| LiCl.H₂O | 10.8 |
| Other salts | 55.9 |
| Total | 100.0 |

Five mixtures of this lithium hypochlorite composition were prepared, each containing 33.3 per cent of the lithium hypochlorite preparation and the following amounts of sodium carbonate and potassium carbonate respectively: (1) 55.5, 11.1; (2) 44.5, 22.2; (3) 33.3, 33.3; (4) 22.2, 44.5; (5) 0, 66.6. The mixtures contained from 10.0 to 10.7 per cent of available chlorine initially compared with the unadmixed lithium hypochlorite preparation which contained about 29.7 per cent available chlorine. After 42 days at 55° C., the original sample had lost 92.8 per cent of its available chlorine while the other five samples had lost respectively 31.4, 37.4, 32.9, 40.0 and 37.0 of their available chlorine.

*Example VI*

The lithium hypochlorite preparation used in this example when analyzed was calculated to contain the following components:

Component:
| | |
|---|---:|
| LiOCl | 20.4 |
| LiOCl.H₂O | 6.4 |
| (LiOCl percent hydrated) | (19.3) |
| LiCl.H₂O | 10.2 |
| Other salts | 63.0 |
| Total | 100.0 |

One composition prepared from this lithium hypochlorite contained 33.3 per cent of the lithium hypochlorite preparation, 44.5 per cent of anhydrous soda ash and 22.2 per cent of anhydrous potassium carbonate. Another composition contained 33.3 per cent of the lithium hypochlorite preparation and 66.6 per cent of anhydrous potassium carbonate. When these samples, together with a sample of unadmixed lithium hypochlorite preparation were stored for 42 days at 55° C., the unadmixed lithium hypochlorite preparation lost 72.2 per cent of its available chlorine, the first mixture 32.8 per cent and the second mixture 33.5 per cent.

This application represents a continuation-in-part of my application Serial No. 595,662 filed May 24, 1945, now U. S. Patent No. 2,534,781, issued December 19, 1950.

I claim:

1. A dry stable lithium hypochlorite composition consisting essentially of the composition formed by combining partially hydrated lithium hypochlorite and finely divided potassium carbonate in an amount in substantial excess of that required to combine with all hydrate water in the composition.

2. A dry stable lithium hypochlorite composition consisting essentially of the composition formed by combining partially hydrated lithium hypochlorite and finely divided potassium carbonate in an amount about twice that required to combine with all hydrate water in the composition.

3. A dry stable lithium hypochlorite composition consisting essentially of the composition formed by combining partially hydrated lithium hypochlorite, finely divided potassium carbonate in an amount in substantial excess of that required to combine with all hydrate water in the composition and a water-soluble alkali metal salt in addition to said potassium carbonate of the class consisting of carbonates, silicates, phosphates and polyphosphates.

4. A dry stable lithium hypochlorite composition consisting essentially of the composition formed by combining partially hydrated lithium hypochlorite, finely divided potassium carbonate in an amount in substantial excess of that required to combine with all hydrate water in the composition, up to about 35 per cent of an organic wetting agent which is stable in the presence of lithium hypochlorite and alkaline components of the composition and a water-soluble alkali metal salt in addition to said potassium carbonate of the class consisting of carbonates, silicates, phosphates and polyphosphates.

5. A dry stable lithium hypochlorite composition consisting essentially of the composition formed by combining partially hydrated lithium hypochlorite, finely divided potassium carbonate in an amount in substantial excess of that required to combine with all hydrate water in the composition, up to about 35 per cent of an organic wetting agent alkali metal salt of the class consisting of alkylated aromatic sulfonates and sulfated alcohols and a water-soluble alkali metal salt in addition to said potassium carbonate of the class consisting of carbonates, silicates, phosphates and polyphosphates.

6. A composition according to claim 5 in which the wetting agent is sodium lauryl sulfate.

7. A composition according to claim 5 in which the wetting agent is an alkyl aryl sulfonate.

References Cited in the file of this patent

UNITED STATES PATENTS

| Number | Name | Date |
|---|---|---|
| 1,339,783 | North | May 11, 1920 |
| 2,415,657 | Riggs et al. | Feb. 11, 1947 |
| 2,435,474 | Soule | Feb. 3, 1948 |
| 2,524,394 | Madorsky | Oct. 3, 1950 |